(12) United States Patent
Chen et al.

(10) Patent No.: US 6,329,782 B1
(45) Date of Patent: Dec. 11, 2001

(54) METHOD AND APPARATUS FOR ROBUST GENERATION OF AN INDEX PULSE FOR AN ELECTRIC POWER STEERING SYSTEM

(75) Inventors: Shaotang Chen; Nady Boules; Bruno Patrice Bernard Lequesne, all of Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/650,170

(22) Filed: Aug. 29, 2000

Related U.S. Application Data

(60) Provisional application No. 60/154,679, filed on Sep. 17, 1999.

(51) Int. Cl.[7] .................................................. H02P 1/24
(52) U.S. Cl. ........................ 318/727; 318/254; 318/138; 318/439; 369/13
(58) Field of Search ................................. 318/727, 254, 318/138, 439; 369/13, 59; 360/78.07

(56) References Cited

U.S. PATENT DOCUMENTS

| | | |
|---|---|---|
| 4,122,478 | 10/1978 | Gallo et al. . |
| 4,599,561 | 7/1986 | Takahashi et al. . |
| 5,739,969 | 4/1998 | Garza . |
| 5,898,301 | 4/1999 | La Croix et al. . |
| 6,014,348 | * 1/2000 | Kim ........................................ 369/13 |
| 6,178,060 | * 1/2001 | Liu ..................................... 360/78.07 |
| 6,215,751 | * 4/2001 | Tsuchinaga ............................. 369/59 |

* cited by examiner

*Primary Examiner*—Karen Masih
(74) *Attorney, Agent, or Firm*—Edmund P. Anderson

(57) ABSTRACT

A method and an apparatus using the method that generates an index pulse which includes firstly the generation of a first electronic signal which includes a first level and a second level based upon a multiphase sinusoidal motor control circuit. Secondly, the generation of at least a second electronic signal that includes a first level and a second level based upon a multiphase sinusoidal motor control circuit wherein the first electronic signal and the second electronic signal are levelly spaced apart based upon the phase number of the multiphase sinusoidal motor control circuit wherein a set difference in level exists for a first specified period between the first and said the signal. Thirdly, the determination of the index pulse based upon a transition from the first level to the second level of the first electronic signal.

19 Claims, 8 Drawing Sheets

POSITION SENSOR SIGNALS

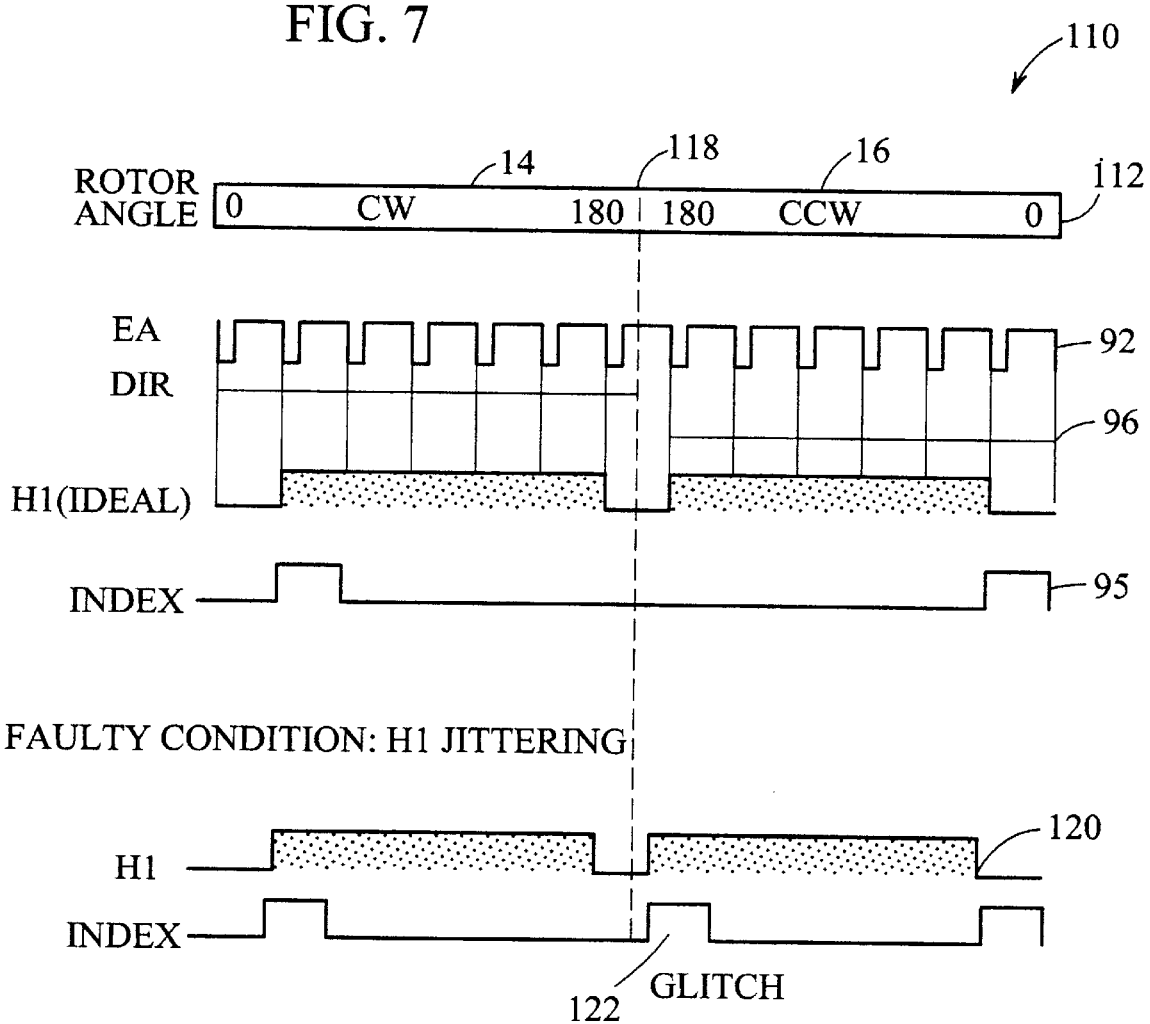

METHOD AND APPARATUS FOR ROBUST GENERATION OF AN INDEX PULSE FOR AN ELECTRIC POWER STEERING SYSTEM

CROSS-REFERENCE TO RELATED APPLICATIONS

This application claims the benefit of U.S. Provisional Application Ser. No. 60/154,679 filed Sep. 17, 1999, which is incorporated herein by reference.

TECHNICAL FIELD

This invention generally relates to the generation of an index pulse, and more particularly, to a robust generation of an index pulse for control purposes in a Torque-Ripple-Free (TRF) Electric Power Steering (EPS) system.

BACKGROUND OF THE INVENTION

One application for robust generation of an index pulse is needed in an electric power steering system (EPS). EPS has been the subject of development by auto manufacturers and suppliers for over a decade because of its fuel economy and ease-of-control advantages compared with the traditional hydraulic power steering (HPS). However, commercialization of EPS systems has been slow and is presently limited to small and midget-class cars due to cost and performance challenges. Among the most challenging technical issues is the pulsating feel at the steering wheel and the audible noise associated with the type of high performance electric drives needed to meet the steering requirements.

The choice of motor type for an EPS is a crucial one, since it determines the characteristics of the drive and the requirements on the power switching devices, controls, and consequently cost. Leading contenders are the Permanent Magnet (PM) brushless motor, the Permanent Magnet (PM) commutator-type and the switched reluctance (SR) motors, each of the three options has its own inherent advantages and limitations. The PM brushless motor, was chosen based on years of experimenting with commutator-type motors. The large motor size and rotor inertia of commutator-type motors limit their applicability to very small cars with reduced steering assist requirements. Additionally, the potential for brush breakage that may result in a rotor lock necessitates the use of a clutch to disconnect the motor from the drive shaft in case of brush failure. SR drives offer an attractive, robust and low cost option, but suffer from inherent excessive torque pulsation and audible noise, unless special measures are taken to reduce such effects. For column assist applications, the motor is located within the passenger compartment and therefore must meet stringent packaging and audible noise requirements that the present SR motor technology may not satisfy. Therefore, the PM brushless motor with its superior characteristics of low inertia, high efficiency and torque density, compared to commutator motors, appears to have the potential for not only meeting the present requirements but also of future high performance EPS systems of medium and large vehicles.

Despite the relatively low levels of torque ripple and noise of EPS systems using conventional PM brushless motors, they are no match to the smoothness and quietness of HPS with decades-long history of performance refinement efforts. Consumers are reluctant in compromising such features. Therefore, a new torque ripple free (TRF) system is needed, which as the name indicates would eradicate the sources of torque ripple (under ideal conditions) and reduces the noise level considerably. The near term goal is to enhance the performance of EPS systems with the long term objective of increasing acceptability of EPS systems for broader usage.

Several performance and cost issues have stood in the way of broad-based EPS commercialization regardless of the technology used, but with varying degree of difficulty. This requires that the following be addressed:

Smooth steering feel of the TRF system can still be affected by transients in assist torque provided by the motor drive due to limitations in motor design and controller operation. For example, the cogging torque due to magnetic interaction between the permanent magnets and the slotted structure of the armature can induce a torque ripple. Another torque ripple at the motor electric frequency can be generated if the current supplied to the motor has a small amount of DC offset due to an inaccuracy in current sensor feedback or other controller related errors. Torque ripples as described above may be understood as a consistent variation of torque level taking place at specific times or specific locations of the rotor. A different source of torque transient is an unexpected or faulty change in torque magnitude or direction. It may be worse inasmuch as it may happen at any time, and may be small or large. Such faulty change in torque must be avoided, and the present invention teaches how to eliminate one possible source of such faulty torque.

Typically, the TRF-EPS system requires a position encoder located on the motor shaft. This encoder provides an incremental, high resolution pulse train; three lower resolution signals used for motor commutation, i.e. to direct the sinusoidal currents to the proper phase; and, an index pulse for the proper timing of the sinusoidal currents. The index pulse is usually derived from the low-resolution commutation signals. Small timing variations occur in the index pulse generating circuit due to hysteresis, temperature changes, aging, etc. Such small timing variations can produce faulty index pulses. A specific class of faulty index pulses were found to occur during changes of steering direction. When a faulty index pulses occurs, an undesirable torque transient follows. It may result in a strong kick at the steering wheel.

SUMMARY OF THE INVENTION

The instant invention relates to the generation of position pulses for the control of polyphase brushless motors. Brushless motors may be classified into two broad categories, (1) motors using trapezoidal current waveforms, and (2) motors using sinusoidal current waveforms. For both categories of motors, a set of sensors may be used to determine which phase of the motor must be excited at any given time. In the case of trapezoidal currents, the set of sensors is all that is needed regarding position information. This can be achieved with a set of 3 sensors, which yield 3 signals that are 120 electrical degrees apart (see signals H1, H2 and H3 in the detailed description section). These sensors are often called "commutation" sensors, because they are used to commutate the motor currents from one phase to another.

Turning now to the generation of sinusoidal currents, absolute position sensing is preferred, with requisite resolution to the order of a few electrical degrees or less. Absolute position sensors, however, are more expensive and only become acceptable for applications without stringent cost restrictions. For those applications that benefit from sinusoidal current waveforms, but need to be designed and operated at low cost, a hybrid solution has been adopted. A lower cost, hybrid solution generally consists of three commutation sensors together with an incremental sensor. The three commutation sensors provide some absolute position, updated every 60 electrical degrees. The incremental sensor acts as a low cost approach to increase resolution in-between commutation pulses. This is possible because the rising and trailing edges of the commutation pulses correspond to predefined absolute rotor positions. An index pulse can be generated from one of the commutation edges to indicate a known initial position.

This invention comprises a novel method to eliminate unintended torque transients caused by false index pulses. It will be appreciated that, when incremental information is combined with an index pulse as is done here to generate absolute position information, the index pulse information must be correct all the time. If for any reason, a false index pulse is generated, there will be a sudden and possibly large change in the position the motor is believed to be at by the system, resulting in a sudden and unwanted torque change. False index pulses are defined as unwanted index pulses mistakenly generated by the controller. It was found that, under some circumstances, prior art sensor systems may generate specific false index pulses. Based on an analysis of the false index pulse, it is found that the false index pulse is produced by timing jittering in encoder signals, and this false index pulse happens only when the encoder is at or around the 180 electrical degree position. Electrical degree is defined as a physical rotation of the rotor divided by the number of pole pairs of the motor. It is noted that the position "180" is defined with respect to 0 degree, where 0 degree is the correct index pulse position. Therefore, a simple solution is proposed to feedback the encoder position information derived from the commutation signals to the index pulse generating logic to disable the index pulse in a region around the 180 electrical degree position. This method can be implemented in software as well as hardware. It can be appreciated that the instant invention may utilize only two commutation signals in a 3-phase machine. For example, in order to reduce the cost of the sensor or for various other reasons, there may be only two "commutation" signals instead of three. Still, this method of creating a blocking window around the 180 degree position could be used. The only difference is that the enabling window will be changed to a different range. The enabling window is defined as a range wherein a set relationship between the commutation signals, as well as the relationship between other signal exists. Thus, the fault free operation principle of the instant invention still remain.

It is noted that although the invention is intended for electric power steering, it could be applied to any electric motor drive wherein an encoder with high resolution signals and commutation signals is used for position feedback and an index pulse is derived from one of the commutation signals.

BRIEF DESCRIPTION OF THE DRAWINGS

FIG. 7 depicts an occurrence of a faulty index pulse.

DESCRIPTION OF THE PREFERRED EMBODIMENT

Figure 1:
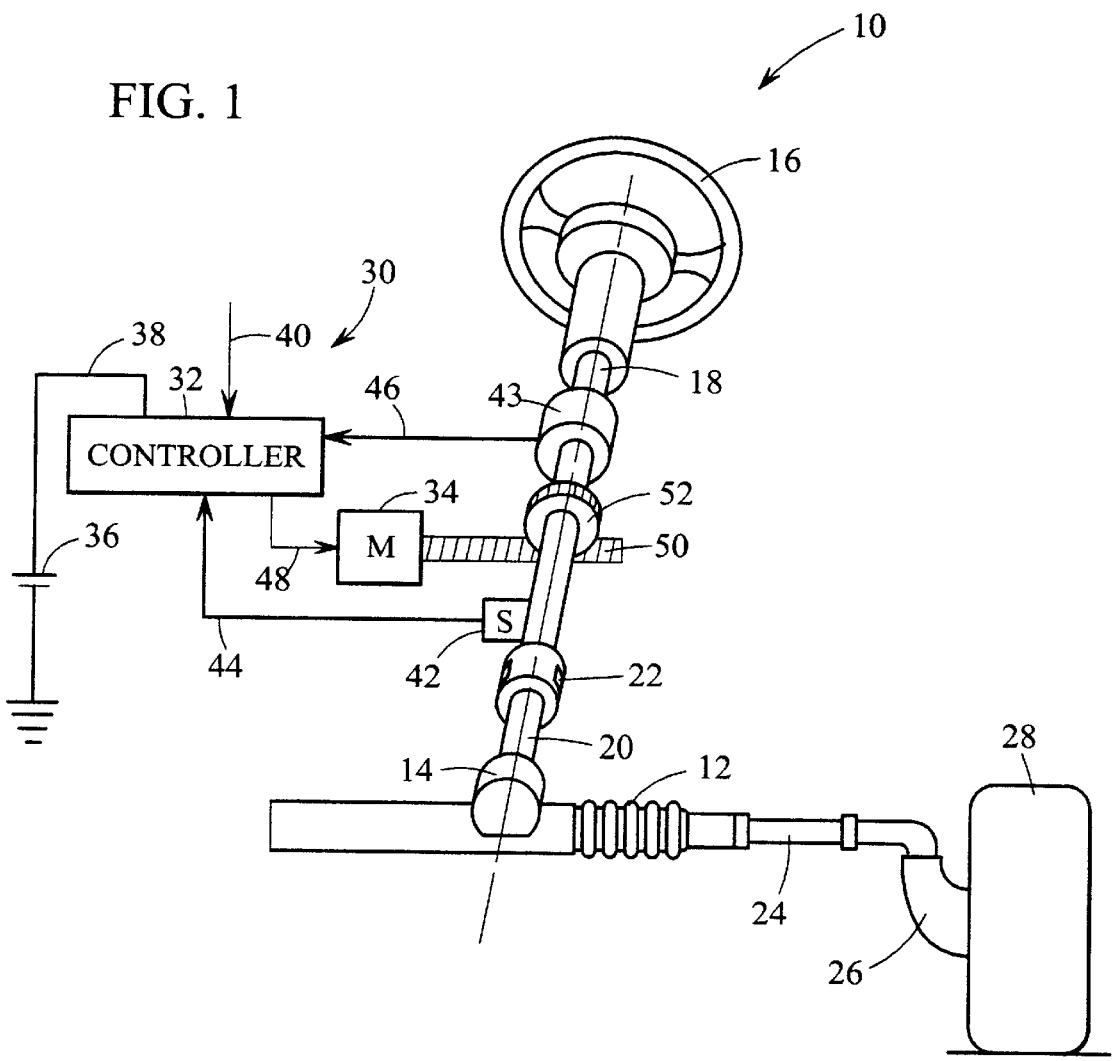
FIG. 1 illustrates a schematic diagram of an electric power steering system.

Referring to FIG. 1, reference numeral 10 generally designates a motor vehicle power steering system suitable for implementation of this invention. The steering mechanism 12 is a rack-and-pinion type system and includes a toothed rack (not shown) and a pinion gear (also not shown) located under gear housing 14. As the steering wheel 16 is turned, the upper steering shaft 18, connected to the lower steering shaft 20 through universal joint 22, turns the pinion gear. Rotation of the pinion gear moves the toothed rack which moves tie rods 24 (only one shown) that in turn moves the steering knuckles 26 (only one shown), which turn wheels 28 (only one shown).

Electric power steering assist is provided through the unit generally designated by reference numeral 30 and includes a controller 32 and the electric motor 34. The controller 32 is powered by a vehicle power supply 36 through line 38. The controller 32 receives a signal representative of the vehicle velocity on line 40. Steering pinion gear angle is measured through position sensor 42, which may be an optical encoding type sensor, variable resistance type sensor or any other suitable type of position sensor, and fed to the controller 32 through line 44.

As the steering wheel 16 is turned, torque sensor 43 senses the torque applied to the steering wheel 16 by the vehicle operator. The torque sensor 43 may include a torsion bar (not shown) and a variable resistive-type sensor (also not shown) which outputs a variable resistance signal to controller 32 through line 46 in relation to the amount of twist on the torsion bar. Although this is the preferable torque sensor, any other suitable torque-sensing device used with known signal processing techniques will suffice.

In response to the inputs on lines 40, 44, and 46, the controller 32 sends a current command or a voltage command through line 48 to the electric motor 34. The motor 34 in turn supplies torque assist to the steering system through a worm 50 and a worm gear 52, in such a way as to providing a torque assist to the vehicle steering in addition to a driving force exerted by the vehicle operator.

Figure 2:
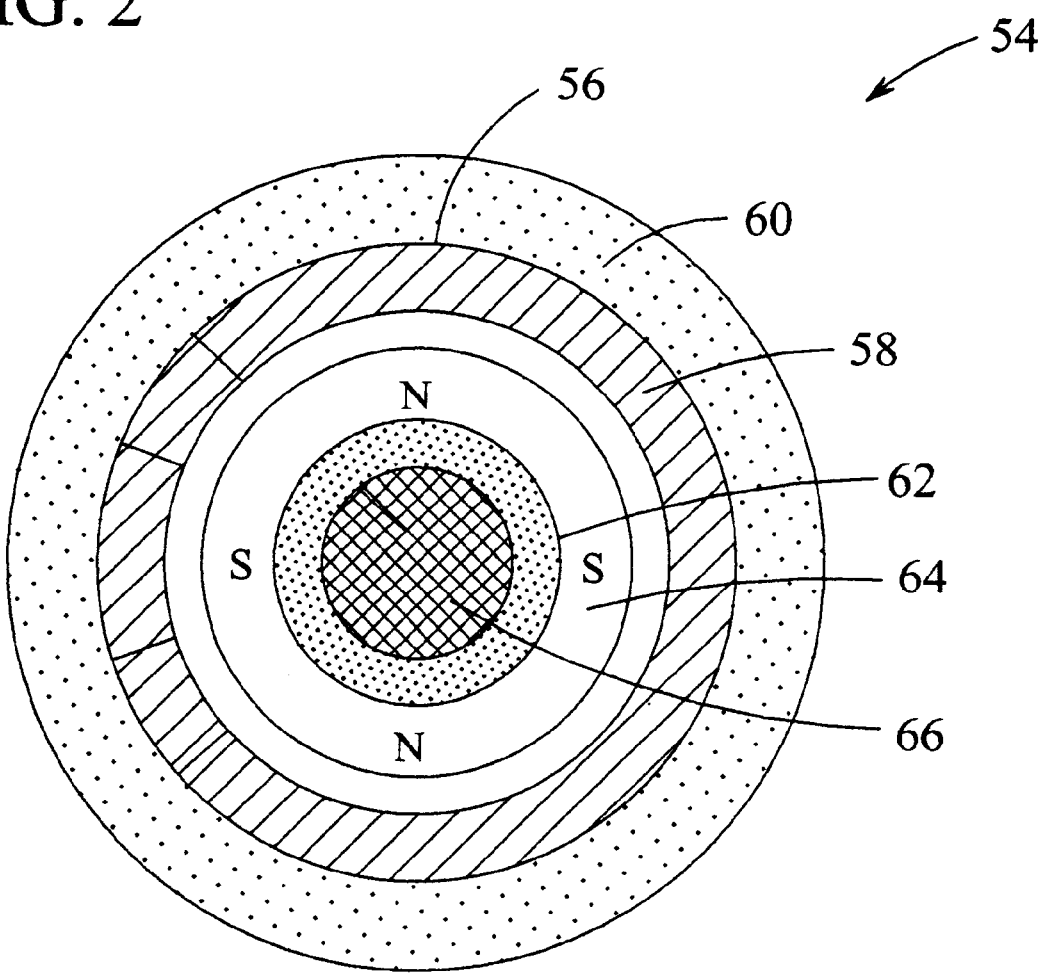
FIG. 2 illustrates a schematic of an embodiment of a TRF motor cross section.

One type of sinusoidal TRF motor may contain several new elements and materials that have not been combined together in one motor in the past. FIG. 2 illustrates a cross section of the sinusoidal TRF motor which is generally designated by the numeral 54. The sinusoidal TRF motor 54 includes a new stator 56 with (a) Air gap (slotless) winding 58, (b) composite iron yoke 60, also acting as a housing; a new rotor 62 with a high energy magnet 64, (c) sinusoidal magnetization of the magnet, (d) molded composite plastic shaft 66. A new high resolution position sensor (not shown) with magnetic resistor (MR) sensing elements and steel wheels (also not shown).

In order to generate motor currents with a sinusoidal shape, the inverter switching devices (e.g. MOSFETS) must be turned on and off at specific rotor angular positions. Therefore, the position of the rotor must be known at all times and an encoder is needed. This requirement is one of the factors adding to the cost of sinusoidal drives, hence traditionally limiting their application to high-performance applications. EPS is a high-performance drive, however it must meet stringent cost limits. Therefore, a new type of encoder is desirable such that it combines high resolution and low cost.

The two most popular ways to sense rotary position are based on optical detection and magnetic field variation. Optical encoders are temperature limited and susceptible to dirt. Semiconductor based magnetic sensors (for instance, magnetoresistors, or MRs), on the other hand, can work at higher temperature, and are starting to be used in automotive applications.

Figure 3:
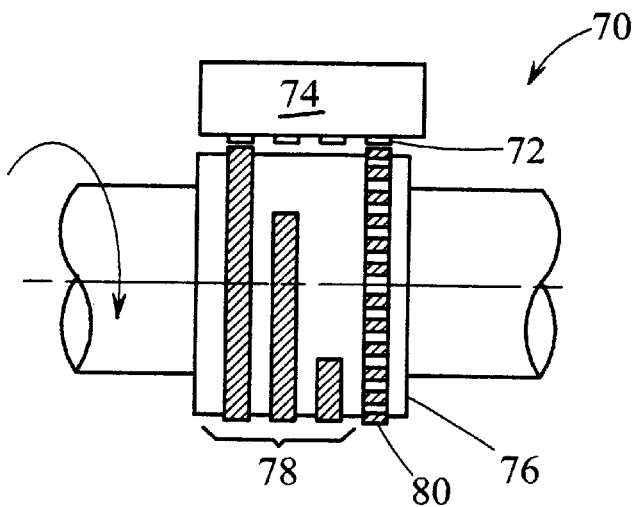
FIG. 3 depicts a four-in-one sensor system for the instant invention.

The basic idea as shown in FIG. 3 includes a four-in-one sensor system 70 using a set of magnetoresistors 72 (MR) mounted on a stationary permanent magnet 74. The stationary permanent magnet 74 faces a steel wheel 76 with several tracks, 78 and 80, each of which has teeth and slots on its periphery, as shown. The teeth and slots modulate the magnet's field and thus produce variations in magnetic field. The variations in magnetic field are sensed by the magnetoresistors 72. The several tracks 78 and 80 on the steel wheel 76 allow a sensing mechanism using the set of magnetoresistors 72 to perform several functions at the same time. A high resolution track 80 provides an incremental signal to enable the generation of sinusoidal currents in the motor. The three other tracks 78 provide absolute signals every 60 electrical degrees. These absolute signals are used for motor commutation, i.e. to direct the current to the appropriate phases, especially at start up, when the rotor position can not be deduced from an incremental sensor alone, even if it is supplemented by an index pulse.

An encoder for a TRF device needs to have the highest resolution possible while keeping the sensor simple enough for low cost. The more teeth on the wheel periphery, the higher the resolution. There is, however, a practical limit to increasing the number of teeth. This limit is caused by the fact it is difficult to locate the magnet much closer than 1.5 mm away from the target wheel, in order to allow for the MR thickness and protective layers on both the magnet and the MR surface, and to provide some clearance between the sensor and the target. If the features on the wheel periphery are much smaller than the gap between the magnet and the wheel, the magnetic field modulation is insignificant and the signal generated is too small to be useful. The sensor resolution is therefore proportional to the sensor wheel diameter. In this particular application, a single MR would provide approximately 4 mechanical degree resolution, which is considered insufficient. Therefore, several MRs are used to generate additional signals and increase resolution to a satisfactory level.

The difficulty in designing a sensor with multiple MRs resides in the fact that the MR signals must all be of similar magnitudes. An MR signal is, typically, an oscillating signal with a dc bias. In order to obtain the final square-wave signal output, the dc bias must be eliminated. The resulting signal zero crossings are then used to trigger a flip-flop and generate a square wave. The dc bias, however, is difficult to predict as it varies with air gap, wheel concentricity, temperature, doping of the MR material, etc. The MR signals are, therefore, best compared with one another as this provides automatic, internal compensation for many of these variations. For such a comparison to be possible, the sensor must be designed to ensure maximum uniformity among the various MRs. A configuration with an array of several MRs facing the same track is chosen. An exemplary number is four. With this approach the MR chips are located close to one another, therefore ensuring air gap and magnetic field uniformity. In addition, the various MRs may be designed to come from essentially the same location on the semiconductor wafer from which they originate, thus minimizing MR material variations. The comparison between the various MRs and the elimination of the dc bias is achieved as follows. The MRs located at both ends of the MR array are spaced exactly one half of a tooth pitch apart, so that their signal outputs are half a period out of phase. Averaging their output, therefore, yields the dc bias. This provides a resolution of 1.25 mechanical degrees (2.5 electrical degrees with 2 pole-pairs). The testing of the overall drive established that this resolution is sufficient for this application.

Figure 4A:
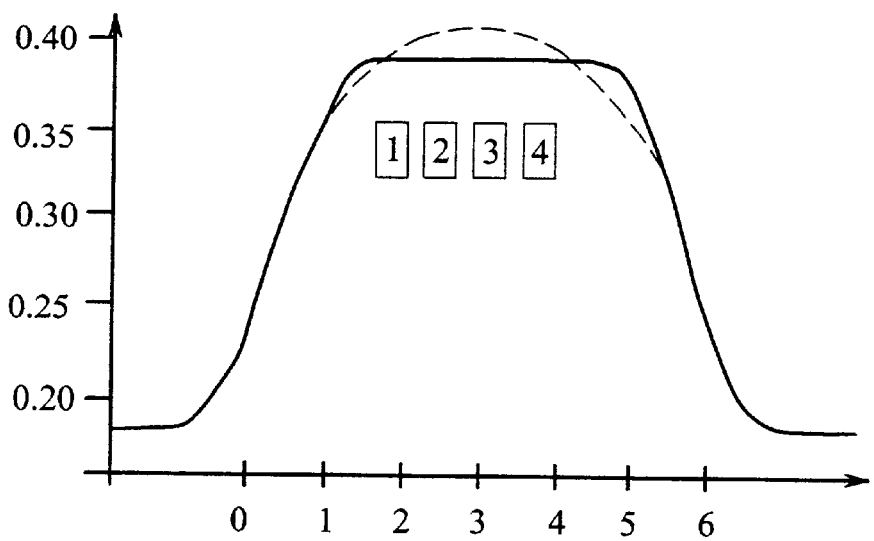
FIGS. 4A and 4B depicts an experiment showing the effect of a ferromagnetic layer.
Figure 4B:
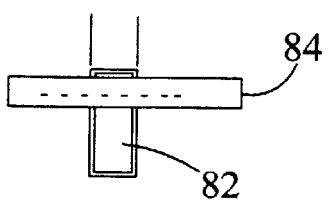

In order to ensure that the four MRs are biased by as uniform a field as possible, a 0.13-mm thick ferromagnetic layer is placed on the magnet surface below the MR array. The effect of a ferromagnetic layer is shown in FIGS. 4A, 4B. It plots the result of a test conducted on a stationary magnet 82 with and without a ferromagnetic layer. The magnetic flux density was measured across the magnet surface in the presence of a steel target 84 emulating the target wheel. A sketch, FIG. 4A, is illustrative of the experimental set up. Without a ferromagnetic layer, the flux density pattern is dome shaped as depicted by the broken lines of FIG. 4A. With a four-MR array where the MRs are 0.5 mm apart (such a four-MR array is also sketched on the figure), there would be a 1% difference in magnetic bias between adjacent MR's. With a ferromagnetic layer, the magnetic bias is identical, as depicted by the solid lines, and this 1% variation is eliminated. The ferromagnetic layer may simply be the leadframe used to hold the MRs and connect them to the outside.

Figure 5A:
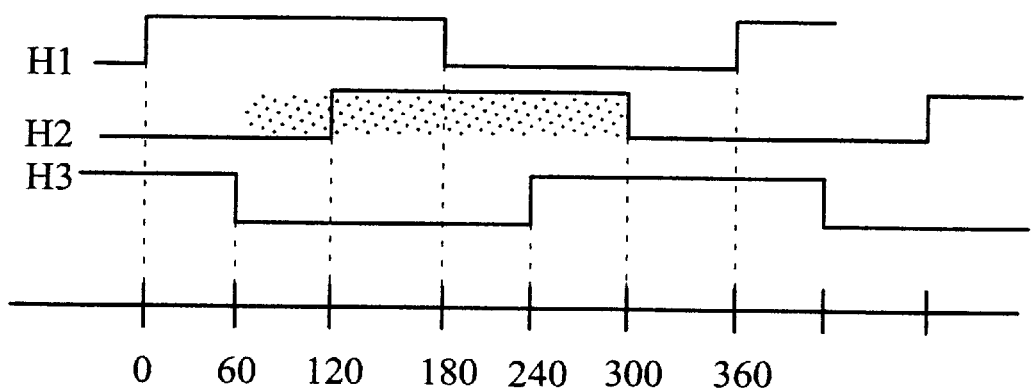
FIGS. 5A and 5B depict a hardware implementation of the index pulse generation circuit for the present invention.
Figure 5B:
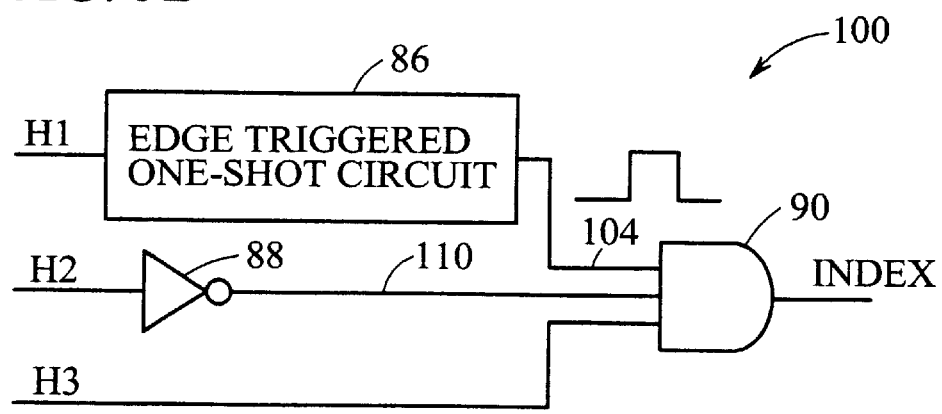

A hardware implementation of the present invention is shown in FIGS. 5A and 5B. Three commutation signals H1, H2, and H3 are described. FIG. 5A shows the logical relationship among commutation signals H1, H2, and H3 in electrical degrees. As shown, between 0–60 degrees, commutation signal H1 is at a logical high, commutation signal H2 is at a logical low, and commutation signal H3 is at a logical high. Usually, the commutation signals are used to produce one index pulse per electrical revolution, to be combined with the incremental position signal to generate the rotor's absolute position as described earlier. The commutation signals' rising and falling edges all occur once per electrical revolution, therefore anyone of them can be used to generate the desired index pulse. Assuming that the rising edge of commutation signal H1 is used to generate the index signal, the above relationship among commutation signals H1, H2, and H3 in electrical degrees may be used for confirming a true index signal versus eliminating a false index signal. In previous implementations, commutation signal H1 was sent to an edge-triggered, one-shot circuit. Such a circuit generated a short-duration pulse with both the rising and falling edges of commutation signals H1, corresponding to 0 and 180 electric degree respectively.

It will be appreciated that if the system turns in both clockwise and counterclockwise directions, as is the case with power steering systems, the same commutation signal edge will be a rising edge during, say, clockwise rotation, and then a "falling edge" during counterclockwise rotation. However, the index pulse must always be generated at the same angular rotation of the rotor. Therefore, the direction-of-rotation signal derived from the two quadrature incremental pulses (in ways known in the art) was used to block the output pulse of the one-shot circuit at one of the two locations, thus providing the desired index pulse consistently at the same angular location, which we call 0 degree. It can also be appreciated that, if the direction-of-rotation signal is in error, then a wrong index pulse occurs which is at position 180 degrees (half an electrical period away from 0 degrees). It is precisely this type of faulty signals which the present invention is aimed at preventing.

With the present invention, the edge-triggered, one-shot circuit, now depicted as 86 in FIG. 5B, is retained, to produce pulses at both H1 edges. Additional circuits, also shown in FIG. 5B, complement this edge-triggered, one-shot circuit as follows:

Commutation signal H2 is subjected to inverter 88, and the output from inverter 88 is then coupled with commutation signal H3 and with the output 104 from edge-triggered, one-shot circuit 86 to serve as inputs to AND gate 90. As can be appreciated, the circuit as depicted in FIG. 5B will not generate the index pulse unless all three inputs of the AND gate are at logical high. It is seen that the circuit still relies on commutation signal H1 to generate the index pulse. However, in addition, it also uses commutation signals H2 and H3 to define a disabling window between 180 minus 120 and 180 plus 120 degrees. This disabling window is shown as lightly shaded in FIG. 5a. Since the correct index pulse must always be produced at zero degree, the disabling window will never block a correct index pulse.

It is also to be noted that the index pulse generation method according to the present invention does not need the direction-of-rotation signal to discriminate between which of the rising and falling edges of H1 correspond to 0 degrees.

In summary, referring again to FIG. 5B, an exemplary index pulse generating circuit 100 is described. The commutation signal H1 is electronically connected to and acts as an input of edge-triggered one-shot circuit 86. The output 104 of the edge-triggered one-shot circuit 86 in turn constitutes an input of AND gate 90. The commutation signal H2 is inverted by inverter 88. The inverted-H2 signal 110 in turn constitutes another input of AND gate 90. Furthermore, H3 constitutes yet another input of AND gate 90. It can be appreciated that both the inverted-H2 110 and H3 signals act together or independently as a check for the output 104.

Figure 5C:
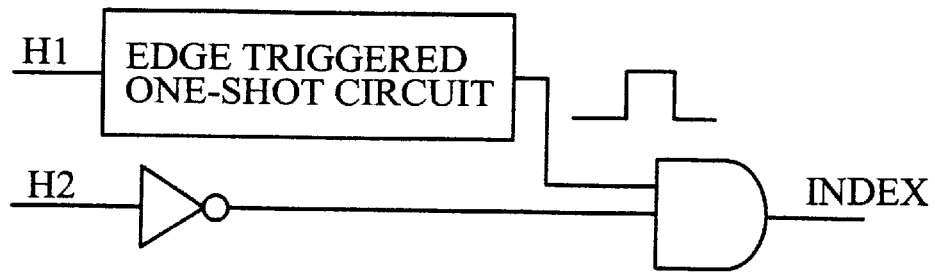
FIGS. 5C through 5E depict an alternative hardware implementation of the index pulse generation circuit for the present invention.
Figure 5D:
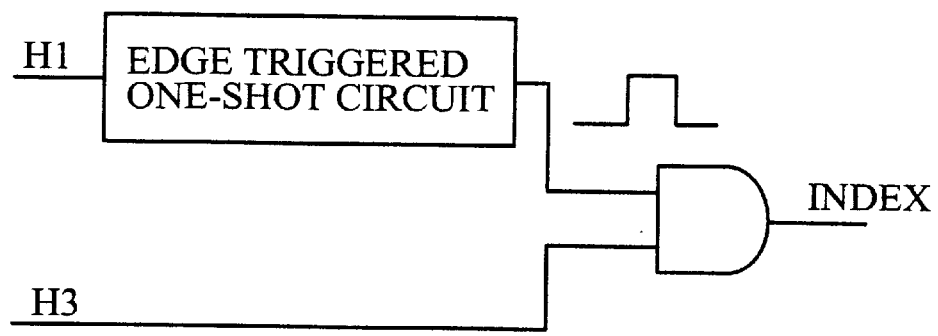

The method was described so far in the case of a 3-phase machine with 3 commutation signals. In some cases, in order to reduce the cost of the sensor or for other reasons, there may be only two "commutation" signals instead of 3. This method of creating a blocking window around the 180 degree position could still be used in that case. Only the enable window will be changed to a different range. The fault free operation principle will remain. Two possible implementations for a case with only two commutation sensors are depicted in FIGS. 5C and 5D, respectively.

Figure 5E:
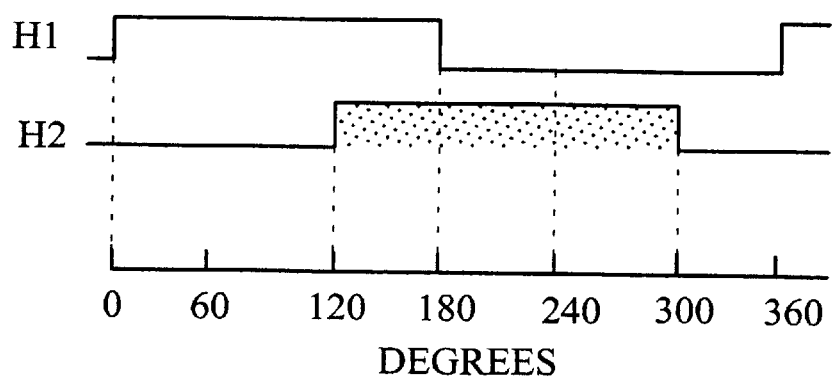
Figure 5F:
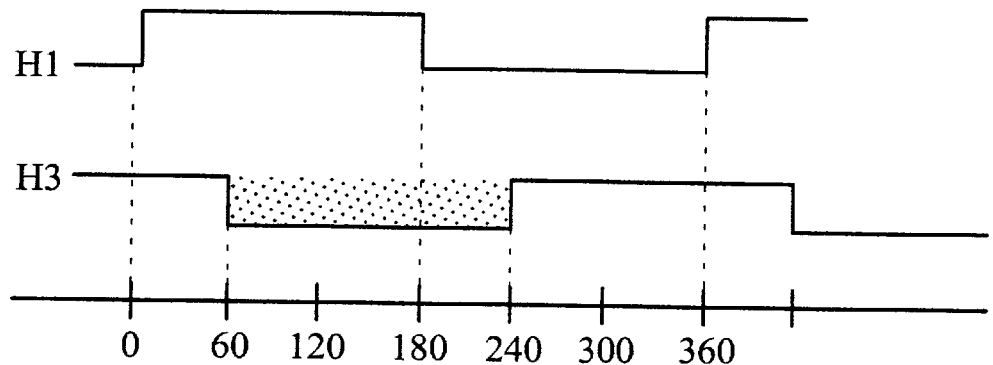
FIGS. 5F through 5H depict yet another hardware implementation of the index pulse generation circuit for the present invention.

The circuits proposed in FIGS. 5C and 5D operate as follows. Referring first to FIG. 5C, the H2-inverted signal blocks out a window spanning from position 120 degrees to position to 300 degrees, or from position 180 degrees minus 60 degrees to position 180 degrees plus 120 degrees, see shaded area in FIG. 5E. Similarly, referring now to FIG. 5D, the H3 signal blocks out a window spanning from position 120 degrees to position 240 degrees, or from position 180 degrees minus 120 degrees to position 180 degrees plus 60 degrees, see shaded area in FIG. 5F.

Figure 5G:
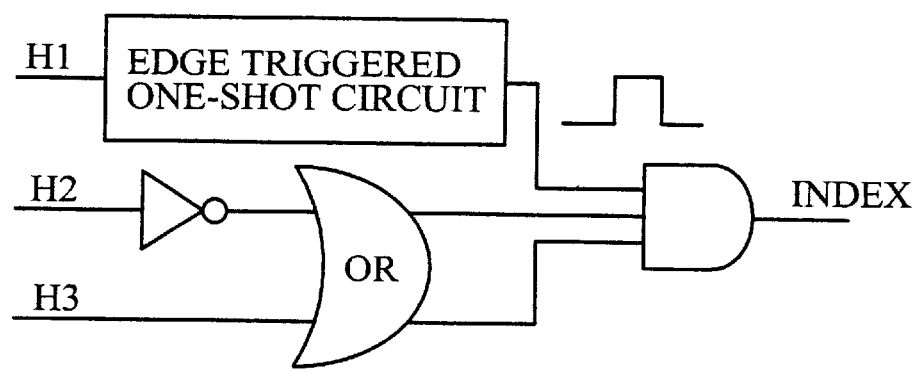
Figure 5H:
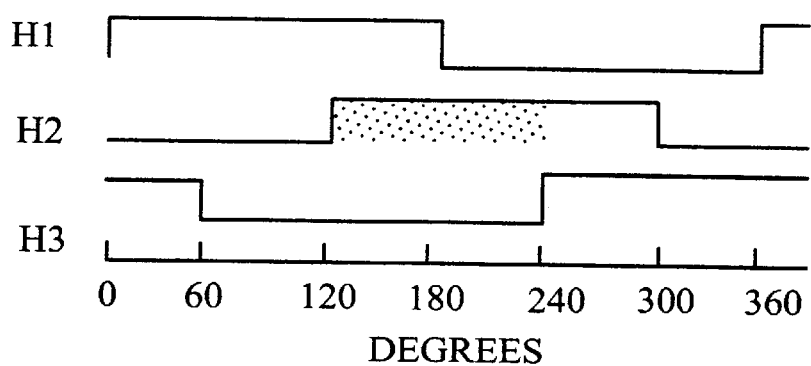

An alternative approach is now depicted in FIG. 5G. In this scenario, the H2-inverted signal is ORed with the H3 signal, before being coupled with the output of edge-triggered one-shot circuit 86. As a result, a narrower window is now blocked, which spans from a position of 120 degrees to a position of 240 degrees (that is, 180 plus or minus 60 degrees), as indicated by the shaded area in FIG. 5H.

It is thus appreciated that the present method consists of using at least one available signal, such as at least one commutation signal, in order to create a blocking window, including, in particular, the 180-degree position where faulty index pulse generation has been observed to occur.

Figure 6:
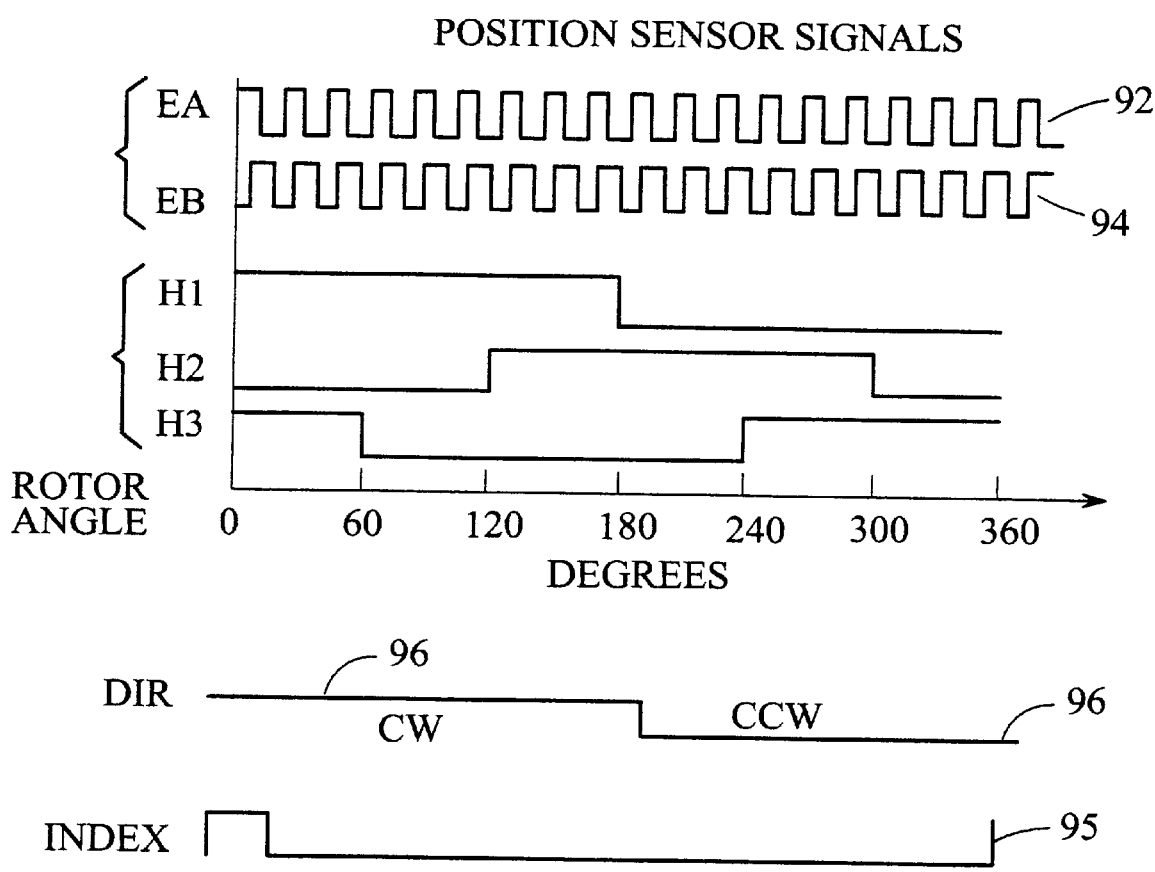
FIG. 6 shows a set of position sensor signals.

As can be appreciated from FIG. 6, a set of position sensor signals are depicted. Signals EA 92 and EB 94 are incremental position signals (EA 92 and EB 94 are in quadrature). Signals EA 92 and EB 94 are generated from the incremental position sensors shown in FIGS. 3 and 4, for instance. Incremental sensors need some form of index pulse 95 to update and verify the pulse count for absolute position. In applications where there is no commutation sensor signal, an index pulse 95 is still needed. The index pulse 95 is then provided by some means, such as a separate sensor and track, or by building the sensor in such a way that one of the incremental pulses looks different, once per revolution. In the case of hybrid commutation/incremental sensors for brushless motors, the commutation signals H1, H2, and H3, or anyone of the three, can be used to provide the desired index pulse 95. By using one of the commutation signals, there will be one index pulse 95 per electrical revolution.

Creating an index pulse from one of the commutation signals is straightforward if that the motor always rotates in the same direction. Therefore, for example, the rising edge of, say, H1, can be used directly to generate a required index pulse. If the motor rotates in both directions, as with electric power steering, however, the index pulse 95 will coincide with the rising edge of H1 in the case of clockwise (CW) rotation, and with the falling edge of H1 in the case of counter-clockwise (CCW) rotation. It is noted that the rising edge of H1 may be used for counter-clockwise (CCW) rotation and the falling edge of H1 may be used for clockwise (CW) rotation. The distinction is done with the help of a direction signal 96 which determines whether a handwheel 16 is turned clockwise, or counter-clockwise, as shown in FIG. 6. It is noted that the direction signal 96 is generated by determining the difference between EA 92 and EB 94 based upon the fact that EA 92 and EB 94 are in quadrature. Thus the direction signal 96 itself is obtained from the two incremental signals in quadrature.

It was noted that the prior art approach may produce faulty outputs if the operating condition changes due to temperature variation or component aging. The faulty condition is generally a consequence of delays in the various signals needed to produce the index signal, namely the direction of rotation derived from EA, EB and H1 commutation signals. While ideally these signals switch instantly and at the proper time, jitters in one or the other of these signals may result in, for instance, commutation signal H1 rising before the direction of rotation signal has been updated. An index pulse may therefore be generated, specifically at or around 180 electrical degrees away from its proper location.

This problem may be present in other drive systems, especially those which rotate in both directions. In electric power steering systems specifically, such a fault is unacceptable because it would be felt by the driver's hand. This invention is to devise a novel index pulse generation circuit for fault-free operation.

Referring to FIG. 7, an example 110 describing the generation of a faulty index pulse in the prior art due to signal timing variation is depicted. A set of rotor angles having clockwise segment 114 and counter clockwise segment 116 is described, representing a rotor which rotates past 180 degrees in a clockwise direction and then turns around and rotates back towards the 0 degree position. The direction-of-rotation DIR signal 96 is the output from a direction detect logic circuit (not shown). Ideally, if the H1 rising edge near 180 degrees occurs after the DIR transient, the output pulse from the one shot circuit will be blocked and no faulty index pulse can be generated at the juncture of 180°. However, if the H1 rising edge occurs shortly before the DIR signal transition due to timing variations in the system, the pulse from the one shot circuit will not be blocked and a faulty index pulse will appear near 180 degrees.

It is noted that although the invention is intended for electric power steering, it could be applied to any electric motor drive where an encoder with high resolution signals and commutation signals is used for position feedback and an index pulse is derived from one of the commutation signals. More generally, the present invention may be used with any drive where an incremental encoder uses an index pulse derived from two or more absolute position signals.

It can be appreciated that this invention is a method that generates an index pulse which includes firstly the generation of a first electronic signal which includes a first level and a second level based upon, for instance, a multiphase sinusoidal motor control circuit. Secondly, the generation of at least a second electronic signal that includes the first level and the second level based upon, in the same instance, a multiphase sinusoidal motor control circuit wherein the first electronic signal and the second electronic signal are levelly spaced apart based upon the phase number of the multiphase sinusoidal motor control circuit wherein a set difference in level exists for a first specified period between the first and said the signal. Thirdly, the determination of the index pulse based upon a transition from the first level to the second level of the first electronic signal.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed is:

1. A method for generating an index pulse comprising:
   generating a first electronic signal including a first level and a second level based upon a motor control circuit;
   generating at least a second electronic signal including said first level and said second level based upon a motor control circuit wherein said first electronic signal and said second electronic signal are levelly spaced apart wherein a set difference in level exists for a first specified period between said first and said second signal; and
   determining said index pulse based upon a transition from said first level to said second level of said first electronic signal.

2. The method of claim 1 further comprising:
   generating a third electronic signal including said first level and said second level based upon a motor control circuit wherein said first electronic signal, said second electronic signal, and said third electronic signal are levelly spaced apart wherein a set difference in level exists between said first, said second and said third electronic signal for a second specified period.

3. The method of claim 1 wherein said set difference in level comprising a zero value; and a non-zero value.

4. The method of claim 1 wherein the determining said index pulse step includes the transition from said second level to said first level of said first electronic signal.

5. The method of claim 1 wherein said motor control circuit is multiphase sinusoidal.

6. The method of claim 1 further comprising the additional step of:
   generating an additional signal including a first level and a second level, wherein said index pulse is enabled when said additional signal is at said first level, and said index pulse is disabled when said additional signal is at said second level.

7. A storage medium encoded with machine-readable computer program code for generating an index pulse, said storage medium including instructions for causing a computer to implement a method comprising:
   generating a first electronic signal including a first level and a second level based upon a multiphase sinusoidal motor control circuit;
   generating at least a second electronic signal including said first level and said second level based upon a motor control circuit wherein said first electronic signal and said second electronic signal are levelly spaced apart based upon the phase number of said multiphase sinusoidal motor control circuit wherein a set difference in level exists for a first specified period between said first and said second signal; and
   determining said index pulse based upon a transition from said first level to said second level of said first electronic signal.

8. The storage medium of claim 7 further comprising instructions for causing a computer to implement:
   generating a third electronic signal including said first level and said second level based upon a multiphase sinusoidal motor control circuit wherein said first electronic signal, said second electronic signal, and said third electronic signal are levelly spaced apart based upon said phase number of said multiphase sinusoidal motor control circuit wherein a set difference in level exists between said first, said second and said third electronic signal for a second specified period.

9. The storage medium of claim 7 wherein said set difference in level comprising a zero value; and a non-zero value.

10. The storage medium of claim 7 wherein the step determining the index pulse includes the transition from said second level to said first level of said first electronic signal.

11. The invention of claim 7 wherein said motor control circuit is multiphase sinusoidal.

12. The invention of claim 7 further comprising the additional step of:
    generating an additional signal including a first level and a second level, wherein said index pulse is enabled when said additional signal is at said first level, and said index pulse is disabled when said additional signal is at said second level.

13. A system for generating an index pulse comprising:

a set of sensors;

a set of electronic signals comprising a first electronic signal including a first level and a second level based upon a motor control circuit generated by said set of sensors, and at least a second electronic signal including said first level and said second level based upon said multiphase sinusoidal motor control circuit wherein said first electronic signal and said second electronic signal are levelly spaced apart based upon the phase number of said multiphase sinusoidal motor control circuit wherein a set difference in level exists for a first specified period between said first and said second signal;

a logical circuit generating said index pulse using said set of electronic signals including a method for:

generating said first electronic signal including said first level and said second level based upon said multiphase sinusoidal motor control circuit;

generating at least said second electronic signal including said first level and said second level based upon said multiphase sinusoidal motor control circuit wherein said first electronic signal and said second electronic signal are levelly spaced apart based upon the phase number of said multiphase sinusoidal motor control circuit wherein said set difference in level exists for said first specified period between said first and said second signal; and determining said index pulse based upon a transition from said first level to said second level of said first electronic signal.

14. The invention of claim 13 wherein said circuit comprising:

at least one inverter gate inverting said second electronic signal; and an AND gate having said first signal and said inverted second signal as input as well as generating said index signal as output.

15. The invention of claim 13 wherein said method for generating an index pulse further comprising:

generating a third electronic signal including said first level and said second level based upon a multiphase sinusoidal motor control circuit wherein said first electronic signal, said second electronic signal, and said third electronic signal are levelly spaced apart based upon said phase number of said multiphase sinusoidal motor control circuit wherein a set difference in level exists between said first, said second and said third electronic signal for a second specified period.

16. The invention of claim 13 wherein said set difference in level comprising a zero value; and a non-zero value.

17. The invention of claim 13 wherein the step determining said index pulse includes the transition from said second level to said first level of said first electronic signal.

18. The invention of claim 13 wherein said motor control circuit is multiphase sinusoidal.

19. The invention of claim 13 wherein said logical circuit executes the additional step of:

generating an additional signal including a first level and a second level, wherein said index pulse is enabled when said additional signal is at said first level, and said index pulse is disabled when said additional signal is at said second level.

* * * * *